US009342575B2

(12) United States Patent
Alewine et al.

(10) Patent No.: US 9,342,575 B2
(45) Date of Patent: May 17, 2016

(54) PROVIDING HIGH AVAILABILITY IN AN ACTIVE/ACTIVE APPLIANCE CLUSTER

(71) Applicant: INTERNATIONAL BUSINESS MACHINES CORPORATION, Armonk, NY (US)

(72) Inventors: Neal J. Alewine, Lake Worth, FL (US); Johnson Ys Chiang, Taipei (TW); Jeffrey Ch Liu, Taipei (TW); Hao-Ting Shih, Taipei (TW); Ying-Kai Wang, Taipei (TW); David Ward, Grafton, MA (US)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 14/103,355

(22) Filed: Dec. 11, 2013

(65) Prior Publication Data

US 2014/0188795 A1   Jul. 3, 2014

(30) Foreign Application Priority Data

Dec. 28, 2012   (TW) .............................. 101151335 A (51) Int. Cl.
*G06F 7/02* (2006.01)
*G06F 17/30* (2006.01)
*G06F 11/16* (2006.01)

(52) U.S. Cl.
CPC ...... *G06F 17/30575* (2013.01); *G06F 11/1662* (2013.01); *G06F 17/30545* (2013.01); *G06F 17/30587* (2013.01)

(58) Field of Classification Search
CPC ............... G06F 17/30575; G06F 17/30587; G06F 11/1658; G06F 11/1662; G06F 11/2025; G06F 11/2069; G06F 11/2023; G06F 17/30545
See application file for complete search history.

(56) References Cited

U.S. PATENT DOCUMENTS

| | | | |
|---|---|---|---|
| 5,473,599 A | 12/1995 | Li et al. | |
| 7,152,179 B1 | 12/2006 | Critchfield | |
| 7,549,079 B2 | 6/2009 | Connolly et al. | |
| 8,024,566 B2 | 9/2011 | Stanev | |
| 8,028,054 B1 | 9/2011 | Watanabe et al. | |
| 8,621,556 B1 * | 12/2013 | Bharali | H04L 61/1511 726/1 |
| 2007/0083641 A1 | 4/2007 | Hu et al. | |
| 2008/0077635 A1 | 3/2008 | Sporny et al. | |

(Continued)

OTHER PUBLICATIONS

IBM Corporation, "DataPower XSL Security Appliance XS40, Version 3.8.2: Enabling Self-Balancing" IBM Corporation, retrieved Dec. 5, 2013, pp. 1-2.

(Continued)

*Primary Examiner* — Bruce Moser
(74) *Attorney, Agent, or Firm* — Law Office of Jim Boice (57) ABSTRACT

A method routes data to an appliance in a high-availability active/active appliance cluster. Messages received by appliances are assigned by a self-balancing module to balance a load of appliances in the appliance cluster, which includes a persistent storing standby group and a transaction processing standby group. Persistent storing data, which is generated by processing the messages, are stored in a virtual persistent storage, which provides an interface between a persistent storage of a primary database appliance and an application for processing the messages. The virtual persistent storage is linked to the persistent storage of the primary database appliance in response to an appliance that receives the messages not being the primary database appliance, thereby sending persistent storing data to the persistent storage of the primary database appliance.

7 Claims, 8 Drawing Sheets

(56) References Cited

U.S. PATENT DOCUMENTS

| | | | | |
|---|---|---|---|---|
| 2008/0250267 | A1* | 10/2008 | Brown | G06F 11/1482 714/4.1 |
| 2009/0287712 | A1 | 11/2009 | Megerian et al. | |
| 2012/0005738 | A1* | 1/2012 | Manini | H04L 63/0209 726/7 |
| 2013/0297798 | A1* | 11/2013 | Arisoylu | H04L 67/1027 709/226 |
| 2013/0336104 | A1* | 12/2013 | Talla | H04L 45/245 370/216 |

OTHER PUBLICATIONS

Anonymous, "End-of-Sale and End-of-Life Announcement for the Cisco Catalyst 3550 Series Switches", Cisco Systems, Inc., retrieved Dec. 5, 2013, pp. 1-2.

Li, et al., "Cisco Hot Standby Router Protocol (HSRP): RFC 2281" The Internet Society, Mar. 1998, pp. 1-16.

Oracle, "Oracle Fusion Middleware High Availability Guide: 1 Introduction to High Availability", Oracle, 2011, retrieved Dec. 11, 2013, pp. 1-6.

J. Rodriguez et al., "IBM WebSphere DataPower SOA Appliances Part IV: Management and Governance", Redbooks, IBM Corporation, Apr. 2008, pp. 1-148.

K. Claffey et al., "Xyratex ClusterStor (TM) 3000: The Future of HPC Storage", Xyratex Technology Limited, 2011, pp. 1-18.

M. Tavis, "Web Application Hosting in the AWS Cloud", White Paper, Amazon Web Services, May 2010, pp. 1-12.

Cisco Systems, Inc., "Building Highly Availalbe Layer 3 Networks with Cisco NX-OS Software and Cisco Nexus 7000 Series Switches", White Paper, Cisco Systems, Inc., Jul. 2011, pp. 1-14.

* cited by examiner

PROVIDING HIGH AVAILABILITY IN AN ACTIVE/ACTIVE APPLIANCE CLUSTER

This application is based on and claims the benefit of priority from Taiwan Patent Application 101151335, filed on Dec. 28, 2012.

BACKGROUND

The present invention relates to the technology of providing high-availability (HA) clusters, and more particularly, to a method, apparatus and computer program product for providing high availability in an active/active appliance cluster.

An active/active appliance cluster is a cluster of appliances (e.g., servers) in which a primary appliance and a secondary (e.g., failover/backup) appliance are both actively running a same operation/application/service.

In a large data center, high-availability clusters usually ensure that multiple servers or appliances can meet business needs. A high-availability cluster is equipped with sufficient components, implemented, and deployed to thereby meet a functional requirement: sufficient redundancy of components (hardware/software or procedure) to mask defined faults. The purpose of the high-availability cluster is to minimize server-related or appliance-related downtime caused by system errors and reduce business loss caused by the system errors. At present, some commercially available products provide the aforesaid function and characteristic.

In general, an appliance, or known as Internet appliance, features built-in networking capability, and has a specific function; and its examples include gateway, router, network attached storage, access point, digital TV set top box, and network file sharing server. For more details about appliances, please make reference to IBM® WebSphere® DataPower Series SOA Appliances or Tivoli® ISS Appliances® (IBM, WebSphere, and Tivoli are registered trademarks owned by International Business Machine in the United States and/or other countries.)

Unlike general-purpose computer devices, an appliance is typically designed to serve a specific purpose or provide a specific service and thus is more robust. Compared with general-purpose computer devices, "appliances" are relatively "closed"—their specific operating systems and applications (or drivers) vary with their intended purposes and services.

In a cluster with multiple appliances, high availability represents an important dimension in deployment of appliances. This is especially true to those appliance products which serve as the processing units of an enterprise in a demilitarized zone (DMZ). As regards a conventional cluster with multiple appliances, a high-availability cluster is usually built with a centralized external persistent storage (such as a self-contained database). From the perspective of an active/active appliance cluster, assuming that transactions processed by an appliance are stateless, as are in the case of typical http webpages, an external load balancer is in use before the cluster is formed with appliances, and thus the transactions can be easily redirected to the other appliances in the cluster.

Those appliances whose transaction persistent state has to remain unchanged are also required to create a high-availability cluster by means of an external system (such as a database). To this end, it is necessary for appliances in the high-availability cluster to exchange states efficiently, for failover implementation to be transparent to an external partner, and for a system architecture to be scalable in order to support deployment of n nodes without imposing great impacts on performance.

Not only does system maintenance pose a problem, but synchronization of data between active/active appliance clusters is also inefficient; hence, users anticipate a solution whereby active/active appliances are self-contained and thus do not rely upon any external system, such as a centralized external persistent storage (say, a self-contained database), and a load balancer. Furthermore, the users also expect that the solution is scalable to n nodes for deployment.

SUMMARY

In one embodiment of the present invention, a method routes data to an appliance in an appliance cluster, wherein the appliance cluster is a high-availability active/active appliance cluster, and wherein the method comprises: receiving messages assigned by a self-balancing module for balancing a load of appliances in the appliance cluster, wherein the appliance cluster comprises two backup standby groups, wherein the two backup standby groups are a persistent storing standby group and a transaction processing standby group, wherein the persistent storing standby group is a subset of the transaction processing standby group and comprises a primary database (DB) appliance and a secondary DB appliance, wherein the transaction processing standby group comprises a primary active appliance and a standby appliance, and wherein the primary active appliance comprises the self-balancing module; storing persistent storing data generated by processing the messages to a virtual persistent storage, wherein the virtual persistent storage provides an interface between a persistent storage of the primary DB appliance and an application for processing the messages; and linking the virtual persistent storage to the persistent storage of the primary DB appliance in the persistent storing standby group in response to an appliance that receives the messages not being the primary DB appliance, so as to route the persistent storing data to the persistent storage of the primary DB appliance, thereby sending the persistent storing data to the persistent storage of the primary DB appliance.

In one embodiment of the present invention, a method executes a preempt by a standby database appliance in a high-availability active/active appliance cluster, wherein the appliance cluster comprises two standby redundant groups, wherein the two standby redundant groups comprise a transaction processing standby group and a persistent storing standby group, wherein the transaction processing standby group comprises a primary active appliance and at least a standby appliance, wherein the primary active appliance comprises a self-balancing module for balancing a load of the appliances in the cluster, wherein the persistent storing standby group is a subset of the transaction processing standby group and comprises a primary DB appliance and a standby (second) database appliance, and wherein the method comprises: receiving a Hello message from the primary DB appliance; examining a priority field in the Hello message for a persistent state of the primary DB appliance to determine whether the standby database appliance requests a preempt according to the persistent state; and implementing failover in response to the preempt request to thereby take over a duty of the primary DB appliance.

In one embodiment of the present invention, a computer program product routes data to an appliance in an appliance cluster, wherein the appliance cluster is a high-availability active/active appliance cluster, wherein the computer program product comprises a computer readable storage medium having program code embodied therewith, the program code readable and executable by a processor to perform a method comprising: receiving messages assigned by a self-balancing module for balancing a load of appliances in the appliance cluster, wherein the appliance cluster comprises two backup standby groups, wherein the two backup standby groups are a persistent storing standby group and a transaction processing standby group, wherein the persistent storing standby group is a subset of the transaction processing standby group and comprises a primary database (DB) appliance and a secondary DB appliance, wherein the transaction processing standby group comprises a primary active appliance and a standby appliance, and wherein the primary active appliance comprises the self-balancing module; storing persistent storing data generated by processing the messages to a virtual persistent storage, wherein the virtual persistent storage provides an interface between a persistent storage of the primary DB appliance and an application for processing the messages; and linking the virtual persistent storage to the persistent storage of the primary DB appliance in the persistent storing standby group in response to an appliance that receives the messages not being the primary DB appliance, so as to route the persistent storing data to the persistent storage of the primary DB appliance, thereby sending the persistent storing data to the persistent storage of the primary DB appliance.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as an appliance, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1 through FIG. 7, appliances, methods, and computer program products are illustrated as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Exemplary Hardware Environment

Figure 1:
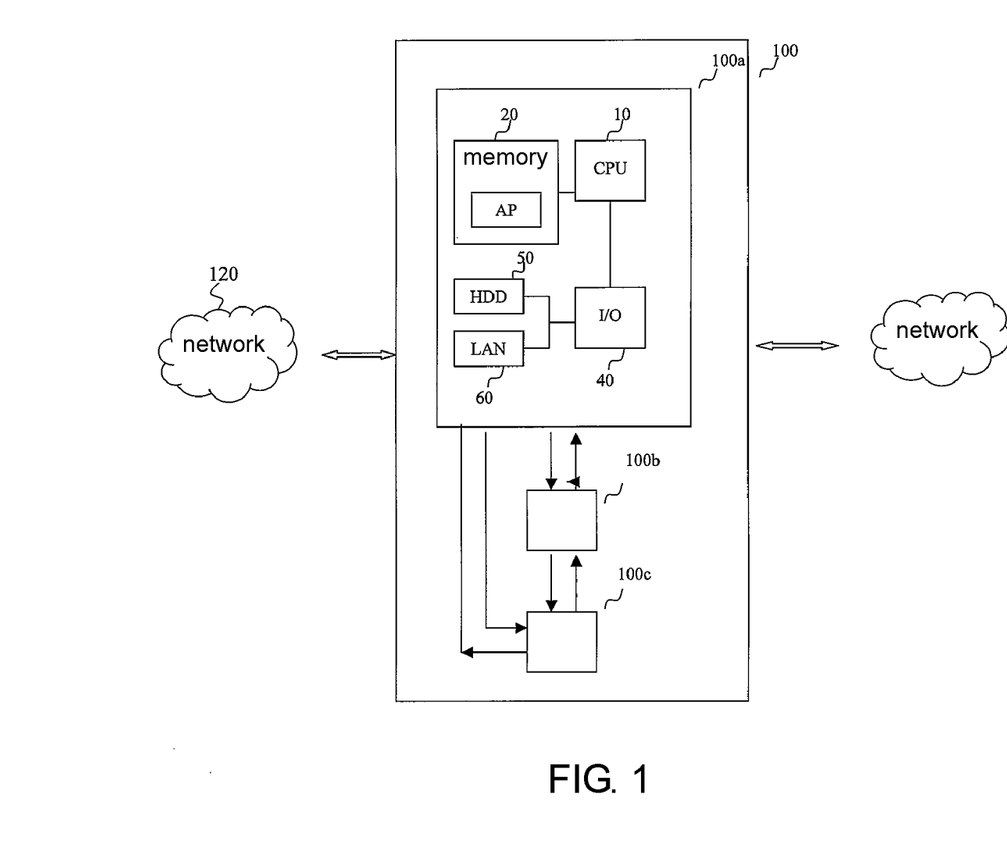
FIG. 1 is a block diagram of the hardware environment of a cluster comprising a plurality of appliances according to an illustrative embodiment of the present invention.

Referring to FIG. 1, there is shown a schematic block diagram of the hardware environment of an appliance cluster including a plurality of appliances according to an illustrative embodiment of the present invention. In an embodiment, the cluster 100 includes three appliances 100a, 100b, and 100c, and the hardware framework of the appliances is similar to that of IBM WebSphere DataPower Series SOA Appliances or Tivoli ISS Appliances.

Each of the appliances 100a, 100b, and 100c may includes: a processor for executing specific applications; a storage device for storing various information and program code; a display device, a communication device, and an input/output device which function as interfaces for communicating with a user; and a peripheral component or other components serving a specific purpose. In another embodiment, the present invention is implemented in another way and thus having less or more other devices or components.

A plurality of appliances 100a, 100b, and 100c in a cluster 100 processes a message attributed to an external enterprise partner system (or client computer) and received from a network 120, and sends a result to a backend on a network server of a subsequent enterprise internal system. The message is a packet, a TCP flow, or a transaction.

Referring to FIG. 1, each of the appliances 100a, 100b, and 100c may include a processor 10, a memory 20, and an input/output (I/O) unit 40. The input/output (I/O) bus is a high-speed serial bus, such as a PCI-e bus, or any other bus structure. It is also feasible for the input/output (I/O) bus to get connected in any other ways directly by means of components interconnected or by means of an additional card. The input/output (I/O) unit 40 can also be coupled to a hard disk drive 50 or a local area network (LAN) adaptor 60. With the LAN adaptor 60, each of the appliances 100a, 100b, and 100c communicates with a user-end computer via a network 120. The required network can also come in a connection of any type, including a wide area network (WAN) or a local area network (LAN) with static IP, or a temporary connection to the Internet through an Internet service provider (ISP), whether by cable connection or by wireless connection. Persons skilled in the art are able to understand that the network can also have other hardware and software elements (such as an additional computer system, a router, or a firewall) not shown in the accompanying drawings. The memory 20 is a random access memory (RAM), a read-only memory (ROM), or an erasable programmable read-only memory (EPROM or Flash memory). The memory 20 stores an operating system, a program code of a dedicated application AP, and various information. An operating system is executed on the processor 10 to coordinate and provide various component controls in the appliances 100a, 100b, and 100c. The processor 10 accesses the memory 20 so as to execute an application AP. The dedicated application comprises a code designed according to a specific purpose or a specific service and adapted to perform a specific transaction, so as to process a message received.

An application AP comprises a standby group processing module and a self-balancing module of the present invention. The standby group processing module comprises an appliance processing transaction module and a standby database appliance processing module. The standby group processing module comprises a program module and an instruction which are required for providing high availability in an active/active appliance cluster according to the present invention. The standby group processing module is a module in the application or is implemented in the form of a daemon. However, in another embodiment, it can be implemented in the form of another type of program. The standby group processing module comprises a code for executing a program illustrated with FIG. 5 and FIG. 6 and described below.

Persons skilled in the art understand that the hardware of the appliances 100a, 100b, and 100c in FIG. 1 varies with embodiment, and can be supplemented by or replaced with another internal hardware or peripheral apparatus, such as Flash ROM, equivalent non-volatile memory, or CD-ROM.

Figure 2:
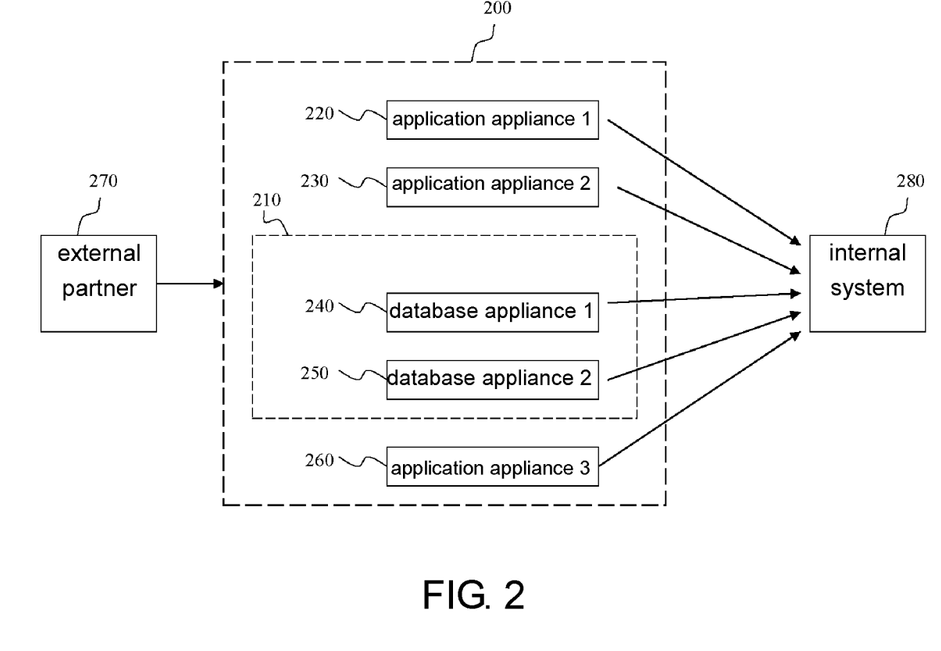
FIG. 2 is a schematic view of a high-availability cluster created from two standby groups according to an embodiment of the present invention.

Referring to FIG. 2, there is shown a schematic view of the high-availability cluster created from two standby groups according to the present invention embodiment. The standby groups are a transaction processing standby group 200 and a persistent storing standby group 210, respectively. For illustrative purpose, FIG. 2 shows five appliances 220, 230, 240, 250, and 260. Each of the appliances comprises a dedicated application designed according to a specific purpose or a specific service, the application AP of the present invention, and a persistent storage for storing persistent storing data. The application AP comprises a self-balancing module and a standby group processing module according to the present invention. The persistent storage is a hard disk drive 50, RAID hard disk drive, or in-memory database. The persistent storing data comprises a transaction state and a transaction data. The transaction data further comprises a metadata, such as a message ID, transaction start and end time, and a transaction result (such as success or failure).

In an embodiment of the present invention, the transaction processing standby group 200 and the persistent storing standby group 210 are created by the conventional Hot Standby Router Protocol (HSRP) developed by Cisco. The Hot Standby Router Protocol is one of the First Hop Redundancy Protocols (FHRP) available today, and its further details are described in RFC 2281. Several other different redundancy protocols developed in the prior art by Cisco include Virtual Router Redundancy Protocol (VRRP) and Gateway Load Balancing Protocol (GLBP).

Referring to FIG. 2, a network engineer configures five appliances in a first subnet and creates a transaction processing standby group 200 by HSRP. The transaction processing standby group 200 is an active/active appliance cluster, wherein each of the appliances functions as a transaction processing unit. The group of appliances is also known as a "redundant group." With HSRP, the appliances are configured together to form a first virtual network entity; meanwhile, a first virtual IP address and a first virtual MAC address are created for use by the first virtual network entity.

The network engineer further selects two of the five appliances, such that the two selected appliances are configured in a second subnet, thereby creating the persistent storing standby group 210 by HSRP. With HSRP, two appliances of the persistent storing standby group 210 are configured together to form a second virtual network entity; meanwhile, a second virtual IP address and a second virtual MAC address are created for use by the second virtual network entity. Hence, at this point in time, the five appliances fall into two categories, namely database appliances 240, 250 and application appliances 220, 230, 260.

Transaction Processing Standby Group 200

Different appliances which are attributed to the transaction processing standby group 200 and configured by HSRP communicate and select a primary active appliance which is in possession of the first virtual IP address and the first virtual MAC address. In practice, an active appliance receives, on behalf of the first virtual network entity, all the traffic flow which originates from an external enterprise partner system (or client) 270. The selection is determined in accordance with pre-configured priority or other appropriate rules.

Furthermore, the active appliance also executes a self-balancing module. The self-balancing module may allot the received traffic flow to the other appliances in the transaction processing standby group 200 according to the workload of each appliance in the transaction processing standby group 200. Hence, the external enterprise partner system 270 sends a transaction to the transaction processing standby group 200 by means of the virtual IP address, and the active appliance in the transaction processing standby group 200 receive the transaction, wherein the self-balancing module therein may redirect the transaction to appropriate appliances in the standby groups according to the workload of each appliance as a conventional external load balancer does. Hence, each of the appliance processes messages assigned and attributed to the external enterprise partner system (or client computer) 270, and send the result to a backend (not shown) on a network server of a subsequent enterprise internal system 280.

Furthermore, a standby appliance is also selected from the transaction processing standby group 200. The selection is determined in accordance with pre-configured priority or other appropriate rules. The active appliance and the standby appliance share the virtual IP address and the virtual MAC address. In practice, only the active appliance is in possession of the first virtual IP address and the first virtual MAC address and thus receive all the traffic flow on behalf of the virtual network entity.

Given HSRP, as soon as the active appliance fail or are down, the standby appliance takes over the duty of the active appliance and, after a short delay, receives all the traffic flow which originates from the external enterprise partner system (or client) 270 on behalf of the virtual network entity, wherein a self-balancing module therein performs the workload balancing function. At this point in time, a new standby appliance is also selected as needed in accordance with pre-configured priority or other appropriate rules. In fact, the selection of the new standby appliance is optional. It is because as soon as the active appliance fails, one of the other appliances in the transaction processing standby group 200 can be determined as a new active appliance in accordance with pre-configured priority or other appropriate rules, so as to take over the duty of the original active appliance.

A point to note is that when an appliance is known as an active appliance or known to be operating in an active mode or in an active state, it means that the appliance receives traffic flow, wherein a self-balancing module therein performs the workload balancing function. Likewise, when an appliance is known as a standby appliance or known to be operating in a standby mode or in a standby state, it means that the appliance is a potential substitute for the active appliance.

With HSRP, the active appliance sends a "Hello" message to the standby appliance in the transaction processing standby group 200 periodically by multicast or broadcast. The standby appliance tests whether the active appliance fails according to whether the "Hello" message is received within a predetermined period of time. If the "Hello" message is not received within the predetermined period of time, the standby appliance will infer that the active appliance has failed and thus will enter the active state to become new active appliance for taking over the duty of the original active appliance.

Persistent Storing Standby Group 210

The persistent storing standby group 210 comprises a primary database (DB) appliance 240 and a secondary (or standby) database appliance 250. The primary DB appliance 240 is in possession of the second virtual IP address and the second virtual MAC address. In practice, the primary DB appliance 240 represents the second virtual network entity. The primary DB appliance 240 is selected to represent the second virtual network entity which is determined by pre-configured priority or another appropriate rule. Hence, the application of each of the appliances 220, 230, 240, 250, and 260 processes a message assigned and attributed to the external enterprise partner system (or client computer) 270, and thus all the persistent storing data (such as the transaction state and the transaction data) created is stored in a persistent storage (not shown) of the primary DB appliance 240 in the persistent storing standby group 210.

The secondary database appliance 250 synchronizes the persistent storing data and the primary DB appliance 240 to ensure that as soon as the primary DB appliance 240 is down, its duty can be taken over. Hence, it is feasible for the persistent storing standby group 210 to serve as the location of the centralized persistent storage of a high-availability cluster.

Operation of Transaction Processing Standby Group 200 and Persistent Storing Standby Group 210

Figure 3A:
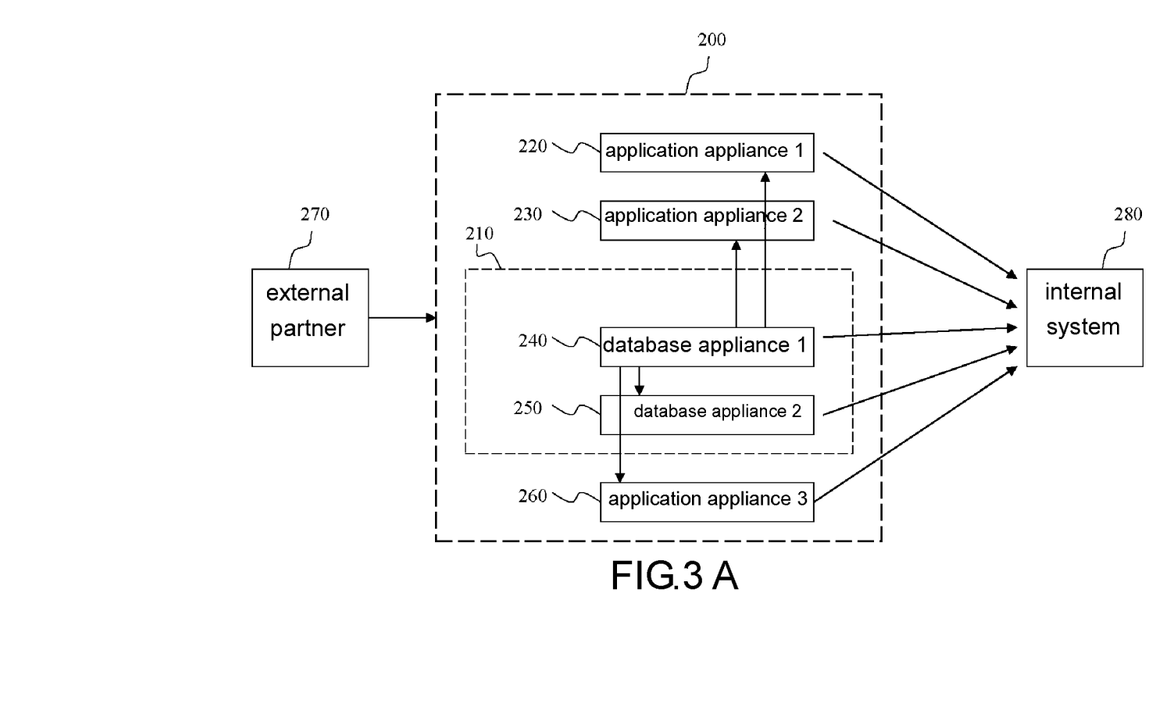
FIG. 3A is a schematic view of tasks performed by a transaction processing standby group 200 operating normally according to an embodiment of the present invention.

Referring to FIG. 3A, there is shown a schematic view of tasks performed by a transaction processing standby group 200 operating normally according to an embodiment of the present invention. As shown in the diagram, the primary DB appliance 240 is selected to be an active appliance which is in possession of the first virtual IP address (such as 9.191.1.11) and the first virtual MAC address. In fact, an active appliance receives, on behalf of the first virtual network entity, all the traffic flow which originates from the external enterprise partner system (or client) 270. The self-balancing module therein allots the received traffic flow to the other appliances in the transaction processing standby group 200 according to the workload of each appliance, in the same way as a conventional external load balancer does.

Figure 3B:
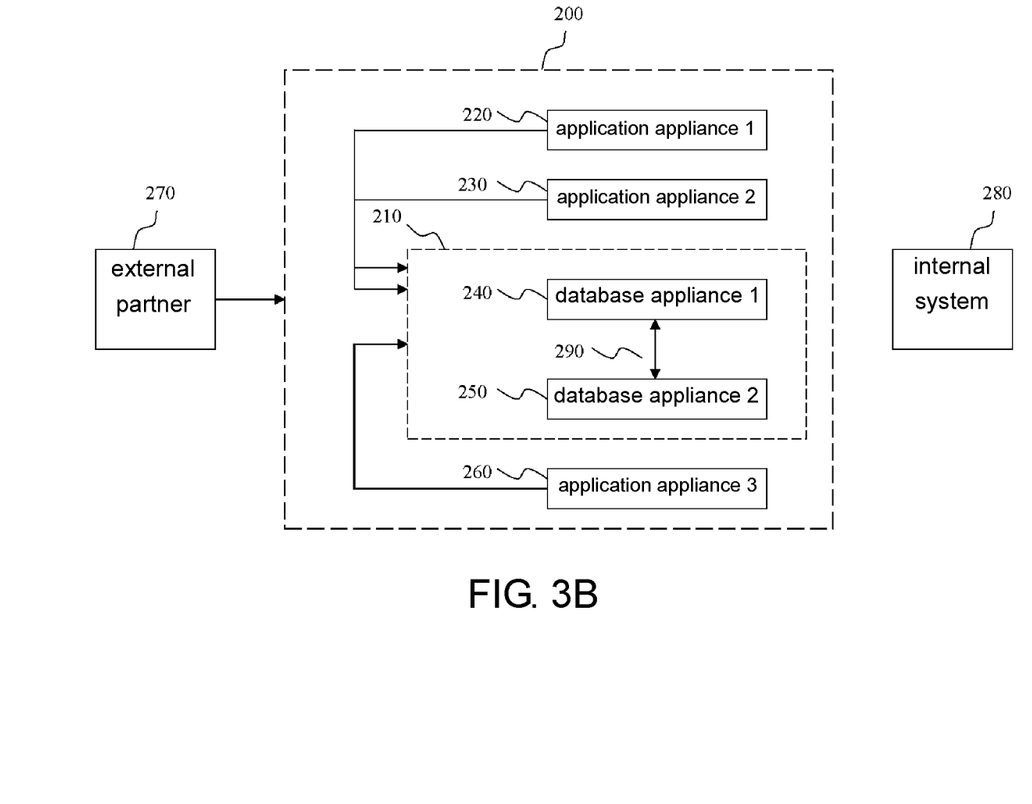
FIG. 3B is a schematic view of tasks performed by a primary DB appliance 240 operating normally according to an embodiment of the present invention.

Referring to FIG. 3B, there is shown a schematic view of tasks performed by the primary DB appliance 240 operating normally according to an embodiment of the present invention. As shown in the diagram, the primary DB appliance 240 is an active appliance in possession of the second virtual IP address (such as 192.168.1.1) and the second virtual MAC address. In practice, the primary DB appliance 240 stores, on behalf of the second virtual network entity, the persistent storing data generated from an application derived from each appliance 220, 230, 240, 250, and 260 to the persistent storage of the primary DB appliance 240 in the persistent storing standby group 210.

The primary DB appliance 240 and the secondary database appliance 250 in the persistent storing standby group 210 communicate with each other 290 by means of the HSRP "Hello" message having the improved HSRP priority attribute of the present invention. The HSRP priority attribute provides a custom-made priority field for carrying data indicative of the persistent state of the sender appliance, such as data indicative of the state of an application or database. Hence, as soon as the HSRP "Hello" message is received, the appliance having received the HSRP "Hello" message knows the state of the application or database of the sender appliance. The secondary database appliance 250 determines, according to the received data indicative of the persistent state, whether it is necessary to preempt the primary DB appliance 240, that is, whether to replace the primary DB appliance 240, thereby taking over its duty on behalf of the second virtual network entity. Hence, given the improved HSRP priority field of the present invention, the determination as to whether the secondary database appliance 250 takes over the primary DB appliance 240 no longer depends on whether the primary DB appliance 240 fails (or is down) according to the conventional HSRP.

For instance, even if the primary DB appliance 240 is still active, its error—for example, a failure of the persistent storage of the primary DB appliance 240 happens and thus the failure state is indicated in the HSRP priority field—will cause the secondary database appliance 250 to receive data which is attributed to the HSRP priority field and indicative of the persistent state, so as to enhance its priority and thereby implement failover and take over the duty of the primary DB appliance 240. At this point in time, the secondary database appliance 250 sends a HSRP COUP message to the primary DB appliance 240 to preempt the primary DB appliance 240 and thus take possession of the second virtual IP address to thereby represent the second virtual network entity.

Furthermore, in an embodiment of the present invention, with HSRP, the persistent storing standby group 210 also exchanges with application appliances 220, 230, 260 a HSRP "Hello" message having the improved HSRP priority field and attributed to appliances in the persistent storing standby group 210. Hence, after the secondary database appliance 250 has taken over the duty of the primary DB appliance 240, one of the application appliances of the transaction processing standby group 200 is automatically selected to join the persistent storing standby group 210 in accordance with pre-configured priority or other appropriate rules to thereby form a new persistent storing standby group. Related details are described later and illustrated with FIG. 7.

Priority Attribute

According to an embodiment of the present invention, the improved HSRP priority attribute includes data indicative of the following:

1. The state of a local persistent storage;
2. Whether the secondary database appliance 250 needs to preempt the primary DB appliance 240, that is, replace the primary DB appliance 240 and thereby take over its duty on behalf of the second virtual network entity; and
3. The state of an application level object, which depends on a dedicated application for use with appliances designed according to a specific purpose or a specific service.

According to an embodiment of the present invention, a custom-made priority field of the improved HSRP priority attribute contains 8 bits. In this regard, bit 1 indicates whether the HSRP state of the appliance is the active state or standby state. Bit 2 through bit 4 indicate the state of the persistent storage of the primary DB appliance 240 and the secondary database appliance 250. They are illustrated with Table 1 below.

TABLE 1

| bit 2, bit 3, bit 4 | What it Means |
|---|---|
| 111 | persistent storage of primary DB appliance 240 is active |
| 101 | persistent storage of primary DB appliance 240 is alone |
| 010 | persistent storage of secondary database appliance 250 is active |
| 000 | persistent storage of secondary database appliance 250 is alone |

If the persistent storage is active, there is a link between the primary DB appliance 240 and the persistent storage of the secondary database appliance 250. If the persistent storage is alone, the link does not exist. Hence, if the state of bit 2 through bit 4 is 101, the persistent storage of the primary DB appliance 240 has probably failed, and the secondary database appliance 250 has its priority increased to implement failover, thereby taking over the duty of the primary DB appliance 240.

Network Architecture of Transaction Processing Standby Group 410 and Persistent Storing Standby Group 420

Figure 4:
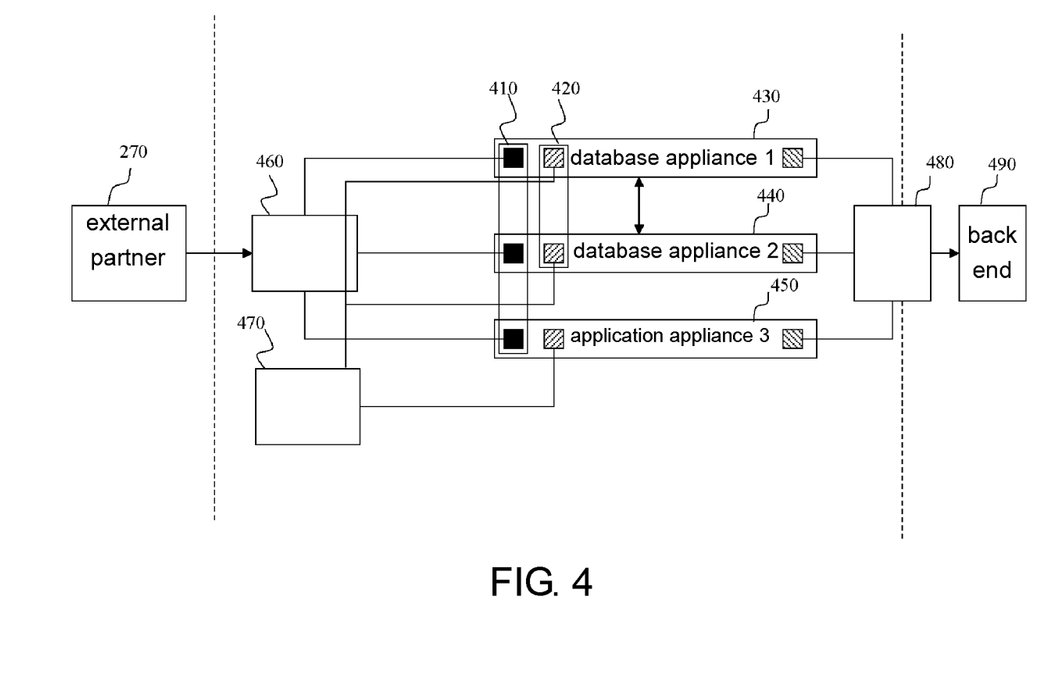
FIG. 4 is a schematic view of the network architecture of a transaction processing standby group and a persistent storing standby group according to an embodiment of the present invention.

FIG. 4 is a schematic view of the network architecture of a transaction processing standby group and a persistent storing standby group according to an embodiment of the present invention. For illustrative purpose, FIG. 4 shows three appliances 430, 440, and 450. Three exchangers 460, 470, 480 are required. The exchangers (or known as tier-2 apparatuses), which are hardware apparatuses operating at the datalink layer, divides a local area network (LAN) into separate collision domains. The exchangers are usually implemented in the form of an appliance designed according to a specific purpose or a specific service.

Referring to FIG. 4, the network engineer configures the three appliances in a first subnet and creates a transaction processing standby group 410 by means of HSRP, the exchanger 460, and a port of an Ethernet interface of each of the appliances. The appliances are configured together to form a first virtual network entity; meanwhile, the first virtual IP address (such as 9.191.1.4) and the first virtual MAC address are created for use by the first virtual network entity.

The network engineer further selects two of the three appliances, configures the two selected appliances in a second subnet, and creates a persistent storing standby group 420 by means of HSRP, the exchanger 470, and another port of an Ethernet interface of each of the appliances. The two appliances of the persistent storing standby group 420 are configured together to form a second virtual network entity; meanwhile, a second virtual IP address (such as 192.168.1.3) and a second virtual MAC address are created for use by the second virtual network entity.

A network link between a backend 490 on a network server of a subsequent enterprise internal system and the three appliances is created by means of the exchanger 480 and a third port of an Ethernet interface of each of the appliances. As shown in the diagram, the exchanger 460 and the exchanger 480 process the traffic flow from the external enterprise partner system (or client) 270 and through the high-availability cluster and then send the result to the backend 490 on a network server of a subsequent enterprise internal system. The exchanger 470 accesses the persistent storing data (such as the transaction state and the transaction data) of the appliances in the high-availability cluster.

Standby Group Processing Module

A standby group processing module comprises an appliance processing transaction module and a standby database application processing module.

Appliance Processing Transaction Module

Figure 5:
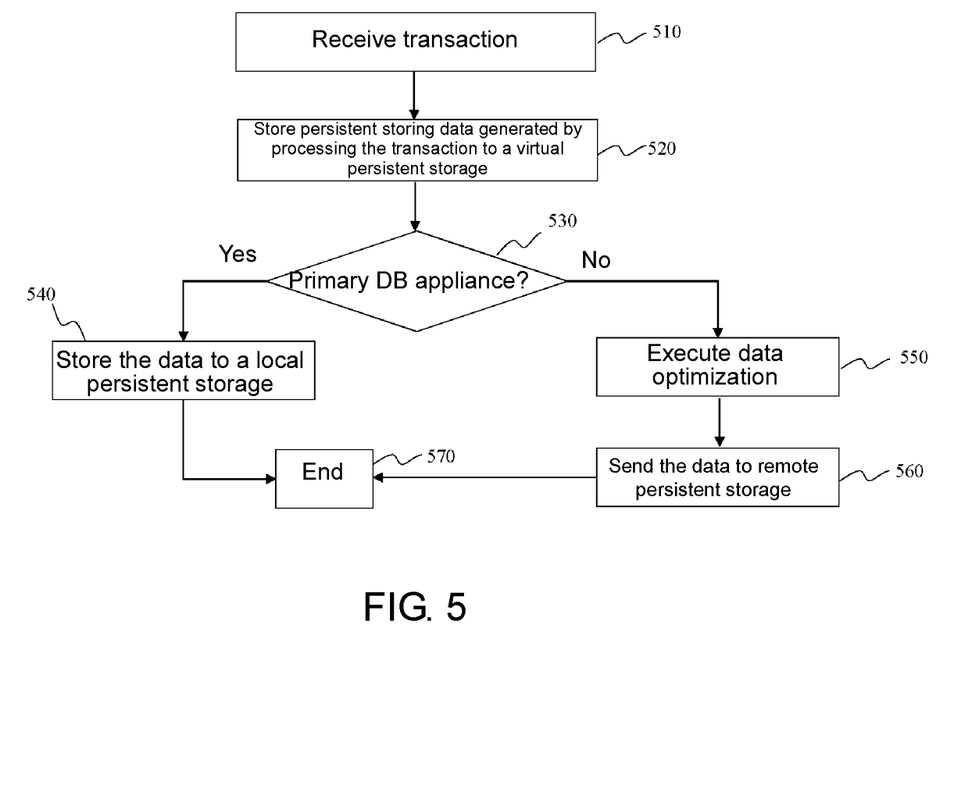
FIG. 5 is a flow chart of a method whereby an appliance processing transaction module processes a transaction with each appliance in the high-availability cluster according to an embodiment of the present invention.

Referring to FIG. 5, there is shown a flow chart of a method whereby an appliance processing transaction module processes a transaction with each appliance in the high-availability cluster according to an embodiment of the present invention. The embodiment of the present invention is illustrated with FIG. 3A and FIG. 5.

Step 510: receiving messages distributed by a self-balancing module executed by the active appliance in the transaction processing standby group 200 in the high-availability cluster and derived from the external enterprise partner system (or client computer) 270. The messages include a packet or a transaction.

Step 520: storing to a virtual persistent storage persistent storing data generated by processing the messages by a dedicated application for use with appliances designed according to a specific purpose or a specific service, wherein the persistent storing data comprises a transaction state and a transaction data, and the transaction data further comprises a metadata, such as a message ID, transaction start and end time, and a transaction result (say, success or failure), wherein the virtual persistent storage provides an interface between a persistent storage and an application for processing the messages. The application accesses the persistent storing data related to the transaction and comprising a transaction state and a transaction data (such as a metadata) through the virtual persistent storage; hence, from the perspective of all the appliances in the cluster, a failure of the primary database (DB) appliance is "transparent."

Step 530: determining whether the appliance itself is a primary DB appliance of the persistent storing standby group 210.

Step 540: storing the persistent storing data to a local persistent storage if the appliance itself is a primary DB appliance. If the appliance itself is a primary DB appliance of the persistent storing standby group 210, the appliance is linked to the local persistent storage of the appliance through the virtual persistent storage.

Step 550: executing optimization of the persistent storing data, such as data compression, encryption, or caching, to allow data to be transmitted efficiently, if the appliance itself is not a primary DB appliance. In fact, step 550 is optional.

Step 560: linking the appliance to a persistent storage of a primary DB appliance of the persistent storing standby group 210 through a virtual persistent storage of the appliance. Hence, if the appliance wants to store the persistent storing data, the data is routed to a persistent storage of the primary DB appliance, and thus the data is sent to the remote persistent storage of the primary DB appliance. From the perspective of all the appliances in the cluster, a failure of the primary DB appliance is "transparent," because the access to the persistent storing data is effectuated through the persistent interface.

The process ends at terminator block 570.

Standby Database Appliance Processing Module

Figure 6:
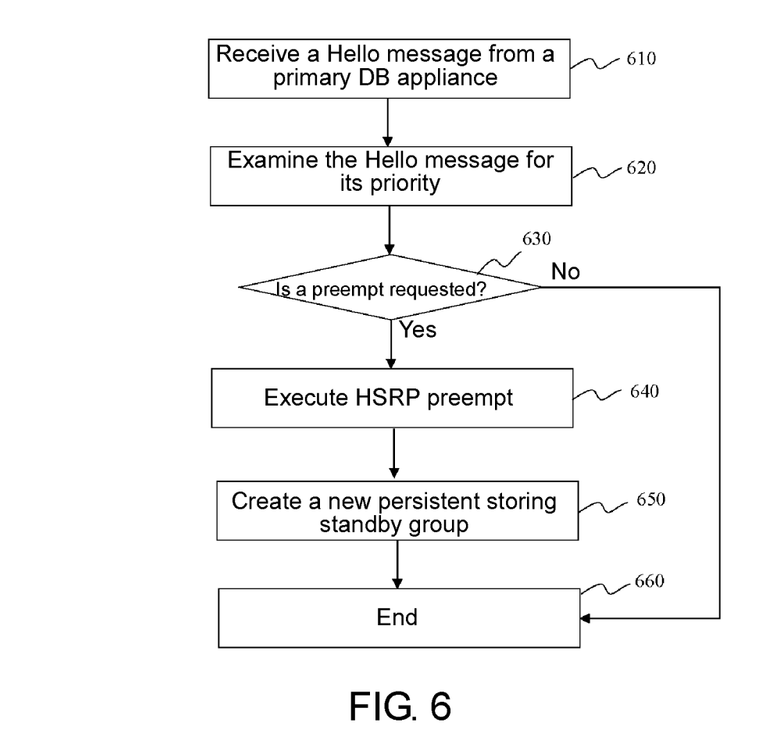
FIG. 6 is a flow chart of a method whereby a standby database appliance processing module executes preemptively a standby database appliance of the persistent storing standby group 210 in the high-availability cluster according to an embodiment of the present invention.

Referring to FIG. 6, there is shown a flow chart of a method whereby a standby database appliance processing module executes preemptively a standby database appliance of the persistent storing standby group 210 in the high-availability cluster according to an embodiment of the present invention.

Step 610: receiving a Hello message from a primary DB appliance.

Step 620: examining a priority field in the Hello message for a persistent state of the primary DB appliance to determine its priority.

Step 630: determining whether the standby database appliance requests a preempt, that is, replacement of the primary DB appliance. Given the improved HSRP priority field of the present invention, the determination as to whether the secondary database appliance 250 takes over the primary DB appliance 240 no longer depends on whether the primary DB appliance 240 fails (or is down) according to the conventional HSRP, but depends on the persistent state of the primary DB appliance.

Step 640: executing HSRP preempt if a preempt is requested according to the persistent state of the primary DB appliance. The preempt increases its priority to implement failover and thus take over the duty of the primary DB appliance 240.

Step 650: creating a new persistent storing standby group. An appliance is selected by a network engineer from the application appliances of the transaction processing standby group 200 to join the new persistent storing standby group. Alternatively, referring to FIG. 7, one of the application appliances of the transaction processing standby group 200 is automatically selected by pre-configured priority or other appropriate rules to join the new persistent storing standby group.

Figure 7:
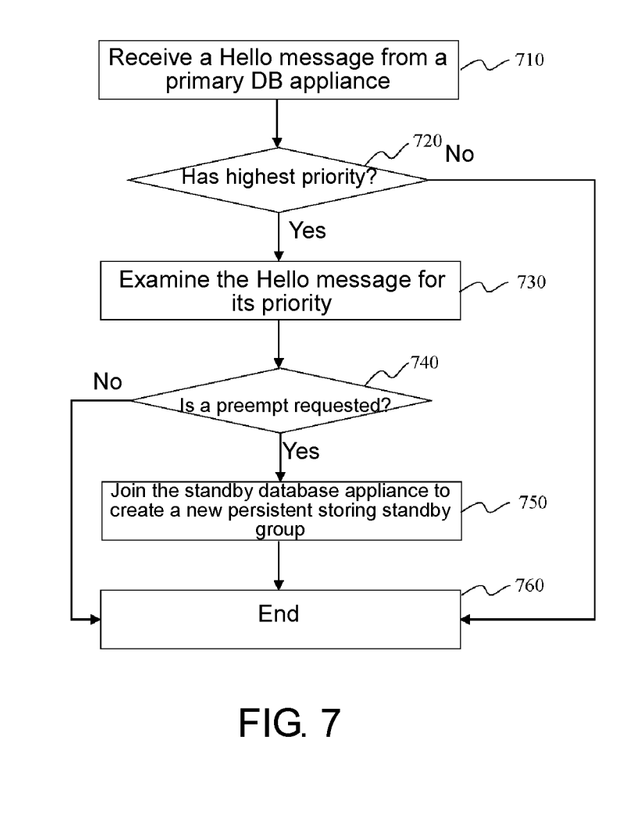
FIG. 7 is a flow chart of a method whereby an application appliance of the transaction processing standby group 200 in the high-availability cluster joins a new persistent storing standby group automatically according to an embodiment of the present invention.

Referring to FIG. 7, there is shown a flow chart of a method whereby an application appliance of the transaction processing standby group 200 in the high-availability cluster joins a new persistent storing standby group automatically according to an embodiment of the present invention.

Step 710: receiving a Hello message from a primary DB appliance.

Step 720: determining whether the appliance has the highest priority among the application appliances of the transaction processing standby group 200.

Step 730: examining a priority field in the Hello message for a persistent state of the primary DB appliance to determine its priority.

Step 740: determining whether the standby database appliance requests a preempt, that is, replacement of the primary DB appliance.

Step 750: joining the standby database appliance to create a new persistent storing standby group and thereby form a new virtual network entity representing a persistent storing standby group.

The aforesaid step of creating standby groups by means of HSRP to form a virtual network entity is regarded as a prior art, its further details are described in RFC 2281. Furthermore, although the aforesaid embodiment of the present invention is exemplified by Hot Standby Router Protocol (HSRP), the present invention is not limited thereto. In another embodiment, the present invention is also applicable to systems or appliances governed by other First Hop Redundancy Protocols (FHRP), such as Virtual Router Redundancy Protocol (VRRP) and Gateway Load Balancing Protocol (GLBP).

As described herein, the present invention enables an active/active high-availability appliance cluster to be created from two standby groups. The standby groups are also known as redundant or backup groups. The standby groups are a first layer transaction processing standby group and a second layer persistent storing standby group, respectively. The first layer transaction processing standby group selects an appliance for executing a self-balancing module and allotting a received traffic flow to other appliances in the transaction processing standby group according to the workload of each appliance in the transaction processing standby group. Hence, according to the present invention, no external additional load balancer is required. The second layer persistent storing standby group is for internal use by the cluster and accesses data stored in a physical persistent storage in a specific appliance of the persistent storing standby group by means of a persistent interface. Hence, from the perspective of all the appliances in the cluster, a failure of the primary database (DB) appliance is "transparent." Hence, according to the present invention, no external additional centralized persistent storage (such as a self-contained database) is required. Furthermore, the present invention is not restrictive of the quantity of appliances.

According to an embodiment of the present invention, a method of providing high availability in an active/active appliance cluster is provided, wherein the appliance cluster comprises two standby (redundant) groups, namely a transaction processing standby group and a persistent storing standby group, wherein the transaction processing standby group comprises a primary active appliance and at least a standby appliance, wherein the primary active appliance comprises a self-balancing module for balancing the load of the appliances in the cluster, wherein the persistent storing standby group is a subset of the transaction processing standby group and comprises a primary database (DB) appliance and a secondary DB appliance, the method comprises the steps of: receiving messages assigned by the self-balancing module; storing persistent storing data generated by processing the messages to a virtual persistent storage, wherein the virtual persistent storage provides an interface between a persistent storage of the primary DB appliance and an application for processing the messages; and linking the virtual persistent storage to the persistent storage of the primary DB appliance in the persistent storing standby group if the appliance is not the primary DB appliance.

According to another embodiment of the present invention, a computer program product comprises a computer-readable medium stored with a program code executable on an appliance to implement the aforesaid method so as to provide high availability in an active/active appliance cluster.

According to another embodiment of the present invention, an appliance comprises: a bus; a memory connected to the bus, wherein the memory comprises an instruction; a processing unit connected to the bus, wherein the processing unit executes the instruction to execute the aforesaid method so as to provide high availability in an active/active appliance cluster.

Furthermore, according to one or more embodiments of the present invention, a method, apparatus and computer program product for providing high availability in an active/active appliance cluster are provided. The appliance cluster includes two standby groups, namely a transaction processing standby group and a persistent storing standby group. The transaction processing standby group includes a primary active appliance and at least a standby appliance. The primary active appliance includes a self-balancing module to balance load of appliances in the cluster. The persistent storing standby group is the subset of the transaction processing standby group, and includes a primary database (DB) appliance and a secondary DB appliance. The method includes the steps of: receiving messages distributed by the self-balancing module; storing persistent storing data generated by processing the messages to a virtual persistent storage, wherein the virtual persistent storage is an interface between an application processing the messages and a persistent storage; and linking the virtual persistent storage to the persistent storage of the primary DB appliance in the persistent storing standby group, if the appliance is not the primary DB appliance.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

What is claimed is:

1. A method for routing data to an appliance in an appliance cluster, wherein the appliance cluster is a high-availability active/active appliance cluster, and wherein the method comprises:

receiving, by one or more processors, messages assigned by a self-balancing module for balancing a load of appliances in the appliance cluster, wherein the appliance cluster comprises two backup standby groups, wherein the two backup standby groups are a persistent storing standby group and a transaction processing standby group, wherein the persistent storing standby group is a subset of the transaction processing standby group and comprises a primary database (DB) appliance and a secondary DB appliance, wherein the transaction processing standby group comprises a primary active appliance and a standby appliance, and wherein the primary active appliance comprises the self-balancing module;

storing, by one or more processors, persistent storing data generated by processing the messages to a virtual persistent storage, wherein the virtual persistent storage provides an interface between a persistent storage of the primary DB appliance and an application for processing the messages; and linking, by one or more processors, the virtual persistent storage to the persistent storage of the primary DB appliance in the persistent storing standby group in response to an appliance that receives the messages not being the primary DB appliance, so as to route the persistent storing data to the persistent storage of the primary DB appliance, thereby sending the persistent storing data to the persistent storage of the primary DB appliance.

2. The method of claim 1, further comprising:

linking, by one or more processors, the virtual persistent storage to a local persistent storage if the appliance that receives the messages is the primary DB appliance, so as to route the persistent storing data to the local persistent storage, thereby sending the data to the local persistent storage.

3. The method of claim 2, wherein the persistent storing data comprises a transaction state and a transaction data of a transaction executed by the primary DB appliance.

4. The method of claim 3, wherein the transaction data comprises a metadata, such as a message ID, transaction start and end time, and a transaction result, wherein the transaction result is either a success or a failure of the transaction executed by the primary DB appliance.

5. The method of claim 3, wherein the standby group is one of a hot standby router protocol (HSRP) group and a virtual router redundant protocol (VRRP) group.

6. The method of claim 3, wherein the messages are one of a packet, a TCP flow, and a transaction.

7. The method of claim 1, further comprising:

optimizing, by one or more processors, the persistent storing data by data compressing, encrypting, and caching the persistent storing data, wherein said optimizing is performed before said linking the virtual persistent storage to a persistent storage of the primary DB appliance of the persistent storing standby group.

* * * * *